Feb. 27, 1968  E. M. TUCKER  3,370,889
TRACTION WHEEL COMPRISING A PADDLE UNIT
ENCLOSED IN A FLEXIBLE ENVELOPE
Filed Aug. 19, 1966
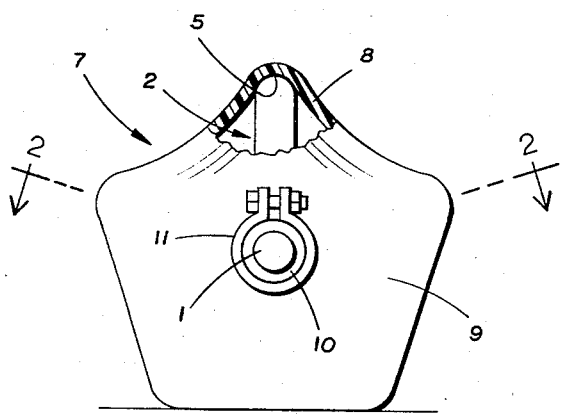
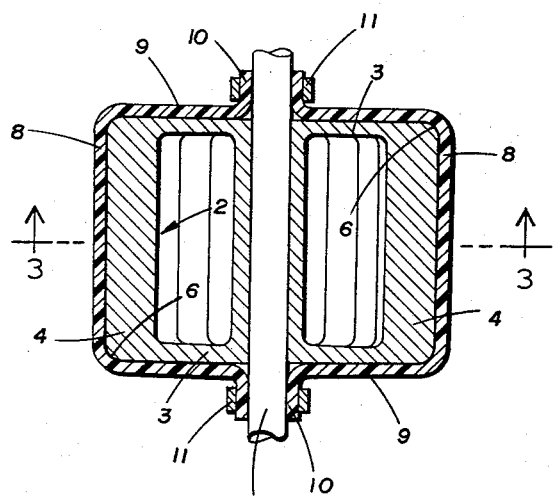
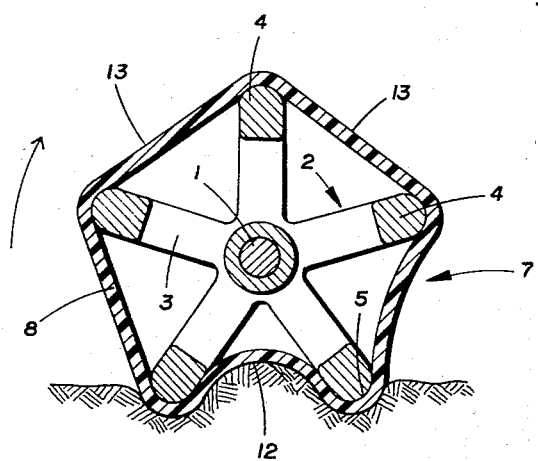
INVENTOR.
Emmitt M. Tucker
BY
Webster & Webster
ATTORNEYS

United States Patent Office 3,370,889
Patented Feb. 27, 1968

3,370,889
TRACTION WHEEL COMPRISING A PADDLE UNIT ENCLOSED IN A FLEXIBLE ENVELOPE
Emmitt M. Tucker, P.O. Box 431,
Ashland, Oreg. 97520
Filed Aug. 19, 1966, Ser. No. 573,609
4 Claims. (Cl. 301—41)

This invention relates generally to traction or driving wheel units for vehicles, and particularly to a wheel unit of this type especially designed for use in soft or yielding terrain such as deep mud, snow, and the like.

The major object of this invention is to provide a wheel unit, for the purpose described, which is so constructed that excellent traction will be obtained under all terrain conditions which may be encountered during the advance of the vehicle, and the wheel unit will be self cleaning so that there is no danger of the traction elements of the wheel unit becoming packed or clogged and thus made relatively ineffective.

Another important object of this invention is to provide a wheel unit, as above, which includes a rigid axle-mounted paddle unit which forms the traction portion of the wheel unit, and a flexible, wheel flotation envelope in which the paddle unit is enclosed; such envelope being so constructed and arranged that the depth to which the individual paddles may project into yielding terrain is limited, while at the same time said envelope serves the self-cleaning function of the wheel unit.

An additional object of this invention is to provide a wheel unit, as in the preceding paragraph, in which the envelope is of waterproof material and is so arranged that no solid matter or moisture can enter the envelope, and which otherwise might ultimately cause malfunctioning of said wheel unit.

A further object of the invention is to provide a wheel unit which is designed for ease and economy of manufacture.

A still further object of the invention is to provide a practical, reliable, and durable wheel unit and one which is exceedingly effective for the purpose for which it is designed.

These objects are accomplished by means of such structure and relative arrangement of parts as will fully appear by a perusal of the following specification and claims.

In the drawings:

FIG. 1 is a side elevation of the improved wheel unit, partly broken out and in section, shown in its initial or normal form, or as operating on a hard even surface.

FIG. 2 is a sectional plan view of the wheel unit, taken substantially on line 2—2 of FIG. 1.

FIG. 3 is a sectional elevation of the wheel unit, taken on line 3—3 of FIG. 2, and showing the wheel unit as operating on soft or yielding terrain.

Referring now more particularly to the drawings and to the characters of reference marked thereon, the wheel unit comprises a central axle 1 adapted to be turnably mounted on a vehicle in any suitable manner so that said axle may be driven by an engine on said vehicle.

Fixed on the axle 1 is a paddle unit including a plurality of relatively wide paddles indicated generally at 2, which paddles project radially from the axle, are of equal length, and are spaced evenly about said axle. Each paddle 2 comprises side spokes 3 which are connected at their outer ends by a heavy cross bar 4 having a rounded, transverse outer edge 5. Also, the side edges or end corners of the cross bars are rounded, as shown at 6. It should be noted, however, that—if desired—the paddles 2 may be solid from side to side and for the full distance between the outer edges 5 and the axle 1.

The paddles 2 are enclosed in a flexible, flotation envelope indicated generally at 7. This envelope comprises a wheel tread band 8 of a suitable type of waterproof and flexible but non-stretchable fabric or plastic. The length of the band 8 is somewhat greater than the actual circumferential distance about the outer edges 5 of the paddles 2, and which outer edges are engaged by but not secured to the band. Thus, the band 8 is normally slack between certain ones of adjacent paddles 2, but the exact position of such slack will vary with the rotation of the wheel unit when in operation, and dependent on the character of terrain being traversed.

The sidewalls 9 of the envelope 7, and which sidewalls enclose the paddles from the sides and abut against the spokes 3, are secured to or integral with the side edges of the band 8 and are of a flexible, water-proof material which, however, may be of a slightly stretchable nature if found necessary or desirable. The sidewalls 9 are each formed with an integral central collar 10 which closely surrounds the adjacent outwardly projecting portion of the axle 1; each collar being engaged by a clamp 11 thereabout.

With the described form and relative sizes of the paddle unit and tread band 8 of the envelope, said band—when the wheel unit is traversing a hard even surface—is distorted but little from a substantially symmetrical peripheral contour relative to the different paddles engaged by said band; the slack usually being in some evidence adjacent the top of the wheel unit as shown in FIG. 1.

When, however, the wheel unit is traversing soft terrain (such as deep mud, snow, and the like) adjacent paddles 2, as they sink into such terrain by reason of the weight of the vehicle on which the wheel unit is mounted, provide the necessary traction for said wheel unit. At the same time, the portion of the tread band 8 between the lower, terrain-engaging paddles, which tread band portion affords the necessary flotation and prevents the lower paddles from sinking too deeply into the soft terrain, becomes distorted upwardly between said lower paddles, as shown at 12 in FIG. 3.

The distortion 12 is possible, of course, by reason of the initial slack in the tread band 8 as previously described. This slack is taken up by the distortion 12 which, of course, results in an increase in the length of the portion of the band which extends between the lower paddles. Since the tread band 8 is not attached to the paddle cross bars 4 but spans the same in slidable relation, the upper tread band portions straighten out between the corresponding paddles as shown at 13 in FIG. 3. The total length of the tread band 8 is calculated so that when an upward distortion 12 of desired height is formed at the bottom of the tread band, all the slack in the band will be taken up, as shown.

Any mud or snow which may have been picked up and compressed into the pocket formed by the distortion 12 will discharge of itself from the tread band 8 as the wheel unit rotates and the initially distorted portion of the tread band straightens out. Thus, the tread band 8 not only provides adequate flotation and prevents the traction paddles from sinking too deeply into soft terrain, but is self-cleaning. Also, in operation of the wheel unit, the sidewalls of the waterproof envelope 7 assure that no mud, snow, nor moisture can enter said wheel unit and contact the paddles 2 to foul the same.

It will, of course, be understood that as many of the wheel units as necessary may be mounted on one vehicle, either in single-file or transversely spaced order, and either driven individually or coupled together, as may be most advantageous.

From the foregoing description, it will be readily seen that there has been produced such a wheel unit as substantially fulfills the objects of the invention as set forth herein.

While this specification sets forth in detail the present and preferred construction of the wheel unit, still in practice such deviations from such detail may be resorted to as do not form a departure from the spirit of the invention, as defined by the appended claims.

Having thus described the invention, the following is claimed as new and useful and upon which Letters Patent is desired:

1. A wheel unit for ground engagement adapted to be mounted on a vehicle and comprising, with a rotatable supporting axle, a paddle unit rigid with the axle and including a plurality of separate paddles projecting radially out from the axle in circumferentially spaced relation thereabout, the paddles having transverse outer edges, and a relatively wide, flexible tread band surrounding the paddle unit and engaging the outer edges of the paddles in circumferentially movable relation thereto there being flexible sidewalls on the band engaging against the paddles, the band and sidewalls together forming an envelope in which the paddle unit is enclosed, and said envelope being of waterproof material.

2. A wheel unit, as in claim 1, in which the band is of non-stretchable material; the total length of the band being a predetermined amount greater than the circumferential distance about said outer edges of the paddles.

3. A wheel unit, as in claim 1, in which the outer ends of the paddles are rounded.

4. A wheel unit, as in claim 1, in which the axle projects from the wheel unit on at least one side; there being a collar on the corresponding sidewall closely engaging the projecting portion of the axle, and a clamp about the collar.

References Cited

UNITED STATES PATENTS

| | | | |
|---|---|---|---|
| 383,625 | 5/1888 | Case | 301—41 |
| 1,425,334 | 8/1922 | Pedroarena | 301—41 |
| 2,652,290 | 9/1953 | Bekker | 305—11 X |
| 2,668,736 | 2/1954 | Poche | 301—41 |
| 3,276,823 | 10/1966 | Tucker | 305—11 |

RICHARD J. JOHNSON, *Primary Examiner.*